United States Patent [19]
Adams, Jr. et al.

[11] 4,085,353
[45] Apr. 18, 1978

[54] REMOTE SENSOR TRIGGER CIRCUIT

[75] Inventors: James R. Adams, Jr.; Dennis J. Wilwerding, both of Littleton, Colo.

[73] Assignee: Rollei of America, Inc., Littleton, Colo.

[21] Appl. No.: 665,839

[22] Filed: Mar. 11, 1976

[51] Int. Cl.² ............................................. H05B 41/32
[52] U.S. Cl. ............................... 315/241 P; 315/151; 315/159; 354/33
[58] Field of Search ................... 315/241 P, 151, 157, 315/159, 129, 134, 135; 354/33, 34, 145

[56] References Cited
U.S. PATENT DOCUMENTS
3,993,928  11/1976  Wilwerding ................... 315/241 P

*Primary Examiner*—Eugene R. LaRoche
*Attorney, Agent, or Firm*—Allegretti, Newitt, Witcoff & McAndrews

[57] ABSTRACT

An improved trigger circuit for triggering an electronic flash apparatus and for energizing a remote sensor is disclosed.

33 Claims, 2 Drawing Figures

REMOTE SENSOR TRIGGER CIRCUIT

REFERENCE TO CO-PENDING APPLICATIONS

Subject matter disclosed but not claimed in this application is disclosed and claimed in co-pending applications by Dennis J. Wilwerding entitled "Remote Light Sensor for Electronic Flash Units", Ser. No. 642,282, filed Dec. 19, 1975, now U.S. Pat. No. 3,908,924, issued Sept. 14, 1976 and entitled "Extended Range Correct Exposure Annunciator", Ser. No. 642,281, filed Dec. 19, 1975, now U.S. Pat. No. 3,993,928, issued Nov. 23, 1976, which are assigned to the same assignee as this application.

BACKGROUND OF THE INVENTION

The present invention relates to automatic electronic or "computer" flash systems. In particular, the present invention relates to an improved triggering circuit for use with automatic electronic flash systems having a remote sensor.

Automatic electronic flash systems include a light producing means, generally a flash tube, which is actuated to illuminate a scene being photographed. A light sensing means detects the scene illumination and produces a light termination or "quench" signal when sufficient light has been produced to properly expose a light sensitive film of an associated camera.

One advantageous flash system utilizes a remote light sensing means or "remote sensor" which is connected to the electronic flash unit by a two-wire cord or cable. Systems of this type are described in U.S. Pat. Nos. 3,714,443 by F. T. Ogawa; 3,737,721 by F. T. Ogawa; 3,793,556 by D. J. Wilwerding; 3,758,822 by D. J. Wilwerding; and 3,914,647 by B. Broekstra and D. J. Wilwerding. While these systems have been generally satisfactory, there has still existed a need for improved flash systems using a remote sensor.

In particular, an improved triggering circuit for electronic flash systems having a remote sensor is needed. Previous systems typically include a transistor which is in a conductive state prior to initiation of the flash. This silicon transistor is connected between the gate and cathode of a silicon controlled rectifier (SCR). Closure of the contacts by the user causes the transistor to turn off which, in turn, turns on the SCR. When the SCR turns on, the triggering pulse is applied to the flash tube.

This prior art triggering circuit has an important disadvantage. The turning off of the transistor results in a gradual rise in the gate voltage rather than an abrupt rise. This gradual rise, which is termed "soft" gating, can result in destruction of the SCR since very large anode to cathode current can flow through just a portion of the SCR when it initially begins to turn on.

SUMMARY OF THE INVENTION

The electronic flash apparatus of the present invention overcomes the soft gating problems of prior art electronic flash triggering circuits. A switching means, typically an SCR, is fired directly with a hard gating pulse.

The electronic flash apparatus of the present invention includes flash producing means, first and second terminals, first and second potential establishing means, first capacitor means, and the switching means. The first and second terminals are adapted to be connected to a remote light sensing means. In addition, contact means are connected between the first and second terminals.

The first potential establishing means is connected between the first terminal and the first main current carrying electrode of the switching means. The second potential establishing means is connected between the first and second terminals.

When the contact means are closed by the user, the first capacitor means produces a signal to the control electrode of the switching means to cause the switching means to switch from a non-conductive to a conductive state. The flash producing means is actuated when the switching means switches from a non-conductive to a conductive state.

DETAILED DESCRIPTION OF THE PREFERRED EMBODIMENTS

Figure 1:
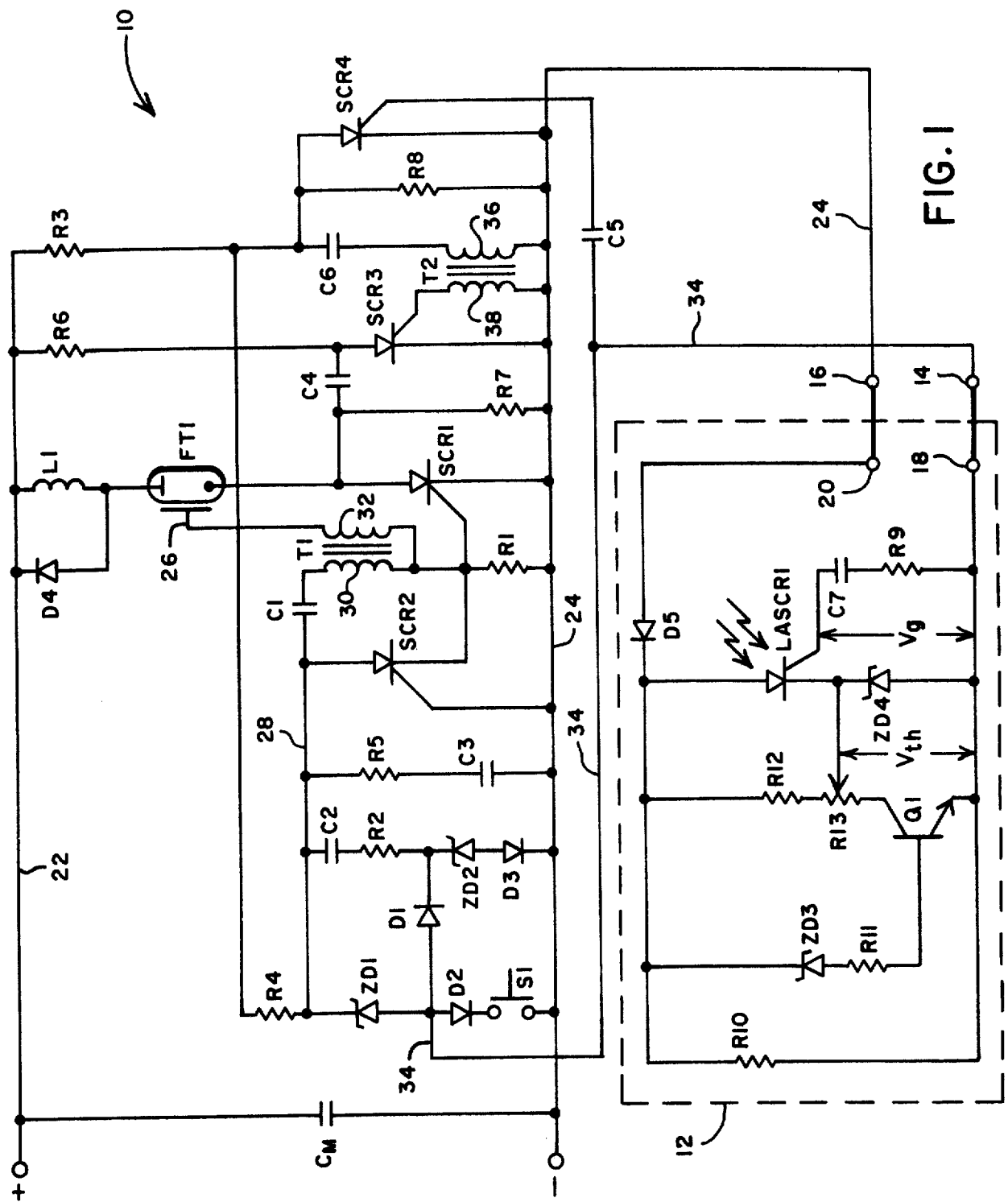
FIG. 1 schematically shows an electronic flash apparatus including the trigger circuit of the present invention.

FIG. 1 shows an electronic flash system including an electronic flash unit 10 and a remote light sensor 12. First and second terminals 14 and 16 of an electronic flash unit 10 are connected to terminals 18 and 20 of remote sensor 12, respectively, by a two-wire cord or cable.

Electronic flash unit 10 includes conductors 22 and 24. Conductor 22 is connected to a positive terminal, and conductor 24 is connected to a negative terminal. The positive and negative terminals are connected to the usual capacitor charging means (not shown but well known in the art).

Main flash storage capacitor $C_M$ is connected between conductors 22 and 24. Also connected between conductors 22 and 24 is the series connection of inductor L1, flash tube FT1, and flash termination switch SCR1. Diode D4 is connected in parallel with inductor L1. As shown in FIG. 1, flash termination switch SCR1 may be a semiconductor switching device such as a silicon controlled rectifier.

In order to initiate a light flash, an ignition signal must be applied to the triggering terminal 26 of flash tube FT1. In addition, SCR1 must be turned on at the same time by a signal to the gate of SCR1. These signals are produced by the triggering circuit which includes resistors R1 – R5, capacitors C1 – C3, diodes D1 – D3, zener diodes ZD1 and ZD2, transformer T1, trigger switching means SCR2, and contacts S1.

First capacitor C1 has one terminal connected to conductor 28 and the opposite terminal connected to a terminal of primary winding 30 of transformer T1. The other terminal of primary winding 30 is connected to resistor R1, which is connected between primary winding 30 and conductor 24. The cathode of SCR1 is connected to the junction of R1 and winding 30.

The secondary winding 32 of transformer T1 has one terminal connected to the junction of primary winding 30 and resistor R1. The opposite terminal is connected to flash triggering terminal 26.

Trigger switching means SCR2 has its anode connected to conductor 28 and its cathode connected to the common terminal of the transformer windings. The gate of SCR2 is connected to terminal 24.

The anode of first zener diode ZD1 is connected to signal line 34, and the cathode of ZD1 is connected to conductor 28. Also connected between conductor 28 and signal line 34 is the series circuit formed by capacitor C2, resistor R2, and cathode to anode of diode D1.

Signal line 34 is connected to first terminal 14, and conductor 24 is connected to second terminal 16. The potential on conductor 24 and, therefore, at terminal 16 is termed the "reference potential". The potential on signal line 34 and, therefore, terminal 14 is termed the "signal line potential".

A series circuit formed by diode D2 and contacts S1 are connected between signal line 34 and conductor 24. The anode of D2 is connected to signal line 34, and the cathode is connected to one terminal of contacts S1. The opposite terminal of S1 is connected to conductor 24.

A series circuit formed by zener diode ZD2 and diode D3 is connected from the cathode of D1 to conductor 24. The cathode of ZD2 is connected to the cathode of D1, the anodes of ZD2 and D3 are connected together, and the cathode of D3 is connected to conductor 24.

Resistors R3, R4, and R5 and capacitor C3 form a series circuit between conductors 22 and 24. Resistor R3 has one terminal connected to conductor 22 and the other terminal connected to a terminal of resistor R4. The opposite terminal of resistor R4 is connected to conductor 28. Resistor R5 and capacitor C3 are connected in series between conductor 28 and conductor 24.

Electronic flash unit 10 also includes a light termination circuit which terminates the light flash by the well known "commutation" technique. The termination circuit includes resistors R6, R7, and R8, capacitors C4, C5, and C6, transformer T2, commutation switch SCR3, and SCR4.

Resistor R6 and the anode-to-cathode current path of SCR3 are connected in series between conductor 22 and conductor 24. Commutation capacitor C4 is connected between the anodes of termination switch SCR1 and commutation switch SCR3. Resistor R7 is connected in parallel with the anode-to-cathode current path of termination switch SCR1.

Capacitor C5 couples any A.C. potential on signal line 34 to gate of SCR4. The anode of SCR4 is connected to the junction of resistors R3 and R4, and the cathode of SCR4 is connected to conductor 24. Resistor R8 is connected in parallel with the anode-to-cathode path of SCR4, as is the series circuit formed by capacitor C6 and primary winding 36 of transformer T2. Secondary winding 38 of T2 is connected between the gate of SCR3 and conductor 24.

Remote sensor 12 is essentially identical to the remote sensor shown in U.S. Pat. No. 3,914,647 by Bert Broekstra and Dennis J. Wilwerding. Reference to that patent should be made for a detailed understanding of the operation of remote sensor 12.

The operation of the flash apparatus of FIG. 1 is generally as follows. Capacitor C2 is initially charged to a voltage determined by ZD1, and capacitors C1 and C3 are charged to a voltage equal to the sum of the zener voltages of ZD1 and ZD2. The signal line potential is determined by ZD2, and is positive with respect to the reference potential.

To initiate a flash, contacts S1 are closed. The closing of contacts S1 drops the signal line potential to approximately the reference potential. Capacitor C1 discharges through ZD1, D2, S1, SCR2 gate-to-cathode, and primary winding 30 of T1 to capacitor C1. The time required to turn on SCR2 is rather short, and, therefore, C1 does not dissipate much energy until SCR2 turns on. At that time, C1 dumps its charge through SCR2 anode-to-cathode and into primary winding 30 of T1. The voltage induced in the secondary winding 32 of T1 is applied to triggering electrode 26 of FT1 to turn on FT1.

With SCR2 on, a discharge path is established for charge stored in capacitor C3, and it discharges through a current path including R5, SCR2 anode-to-cathode, and SCR1 gate-to-cathode. The time constant of C3 and R5 is selected so that the gate current is maintained on SCR1 until sufficient current is available through flash tube FT1 to keep SCR1 in conduction.

When SCR2 turns on, the potential at conductor 28 is reduced. This causes capacitor C2 to drive signal line 34 negative to a voltage determined by remote sensor 12. The time constant of C2 and R2 allows C2 to maintain the negative voltage level on signal line 34 for about 5 milliseconds and thereby power remote sensor 12 until the flash is completed, since a typical flash has a duration of about 1.5 milliseconds or less.

Zener diode ZD1 and capacitor C2, therefore, are first potential establishing means which establish a potential between conductor 28 and signal line 34. Zener diode ZD2 is a second potential establishing means which establishes a potential between signal line 34 and conductor 24 prior to closure of contacts S1.

Diode D2 is a first isolating means which isolates signal line 34 from contacts S1 when the signal line potential becomes negative with respect to the reference potential. Diode D2, therefore, allows signal line 34 to be driven negative regardless of whether contacts S1 are open or closed.

Diode D3 is second isolating means for isolating the second potential establishing means (ZD2) from signal line 34 when the signal line potential is negative. Diode D3 allows signal line 34 to be driven below ground further than 1 diode drop. If D3 were not present, ZD2 would become forward biased as soon as C2 began to drive signal line 34 negative with respect to reference conductor 24.

Diode D1 ensures that no retriggering can occur until the anode voltage is above the ZD1 voltage level. Retriggering due to contact bounce or noise is prevented.

When signal line 34 is driven negative, remote sensor 12, and in particular LASCR1, is enabled. A current representative of the amount of light received by LASCR1 begins to flow through its gate to intergrating capacitor C7 and through anticipation resistor R9.

When the voltage $V_g$ at the gate of LASCR1 exceeds a threshold voltage $V_{th}$, and an enabling signal is present across the anode-to-cathode path of LASCR1, LASCR1 becomes conductive. When LASCR1 beomes conductive, a relatively low resistance path is presented between signal line 34 and reference line 24. The signal line potential exhibits a step change in the positive direction toward the reference potential. This positive step change is coupled through capacitor C5 to gate of SCR4, thereby turning on SCR4. This, in turn, results in the turning on of SCR3. When SCR3 is turned on, commutation of SCR1 occurs, and SCR1 is turned off. When SCR1 turns off, the light flash is terminated.

The trigger circuit of the present invention has several advantages. First, SCR2 is fired directly by a hard gate pulse. This hard gate pulse is produced by closing contacts S1 and essentially shorting out zener diode ZD2. This abrupt change in voltage between signal line 34 and reference line 24 allows capacitor C1 to discharge into the gate of SCR2. Second, the trigger circuit of the present invention prevents retriggering of the flash due to noise or contact bounce. Third, the trigger circuit of the present invention, and in particular zener diodes ZD1 and ZD2, provide a constant trigger voltage. Fourth, the trigger circuit is simple and uses a relatively small number of components.

Figure 2:
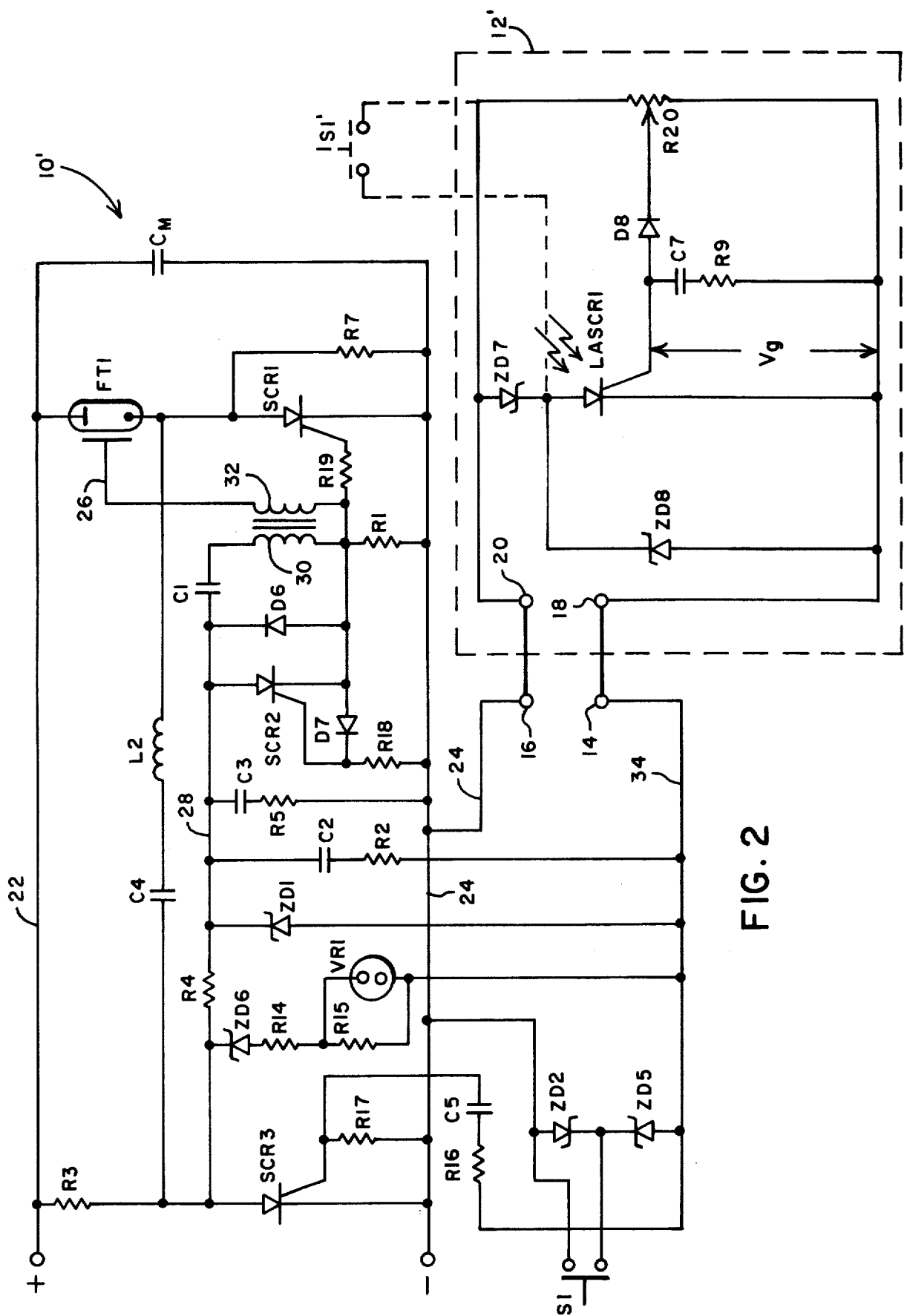
FIG. 2 schematically shows another preferred embodiment of electronic flash apparatus including the triggering circuit of the present invention.

FIG. 2 shows another embodiment of the present invention. The electronic flash system is generally similar to the system shown in FIG. 1, and similar numerals and letters have been used to designate similar elements.

FIG. 2 represents a simplified version of the triggering circuit of FIG. 1. Diodes D1, D2, and D3 of FIG. 1 have been replaced by zener diode ZD5, which has its anode connected to signal line 34 and its cathode connected to the cathode of ZD2. With the arrangement of FIG. 2, contacts S1 are connected directly across zener diode ZD2. Zener diode ZD5 performs the isolation provided by diodes D2 and D3 of FIG. 1. In other words, ZD5 is both the first and the second isolating means which isolates both contacts S1 and zener diode ZD2 from the signal line when the signal line is driven negative.

The other significant changes to the electronic flash apparatus 10' is the addition of an indicator lamp circuit and the simplification of the commutation circuit. The indicator lamp circuit is formed by zener diode ZD6, resistors R14, and R15, and indicator lamp VR1. The cathode of ZD6 is connected to the anode of SCR3. The series circuit of R14 and R15 is connected from the anode of ZD6 to signal line 34. Indicator VR1 is connected across R15.

The commutation circuit has been simplified by eliminating SCR4, T2, C6, and R8 of FIG. 1. Signal line 34 is connected through resistor R16 and capacitor C5 to the gate of SCR3. Resistor R17 is connected between gate and cathode of SCR3.

The other minor changes to flash unit 10' are the addition of diodes D6 and D7, resistors R18 and R19, and inductor L2.

The remote sensor 12' of FIG. 2 is described in further detail in the previously mentioned co-pending application by Dennis J. Wilwerding entitled "Remote Light Sensor for Electronic Flash Units". Reference to this co-pending application should be made for more detailed description of remote light sensor 12'.

The operation of the system of FIG. 2 is generally similar to that of FIG. 1. Initially, main storage capacitor $C_M$ is charged to a relatively high voltage (generally about 360 volts) by the usual capacitor charging means (not shown). Commutation capacitor C4 charges to the voltage on $C_M$ through the charging circuit formed by resistors R3 and R7 and inductor L2.

With commutation capacitor C4 charged, capacitor C2 charges to a voltage determined by the zener voltage of ZD1. Capacitors C1 and C3 charge to a voltage limited by ZD1 and ZD2 or ZD7, depending upon whether the zener voltage of ZD2 is less than or greater than the zener voltage of ZD7. In the preferred embodiment, the zener voltage of ZD2 exceeds the zener voltage of ZD7, and the zener voltage of ZD5 exceeds the zener voltage of ZD8. ZD7 and ZD8, therefore, limit the voltage levels of the signal line potential when remote sensor 12' is connected. Capacitor C5 is charged to a voltage equal to the zener voltage of ZD7 plus the forward voltage drop of ZD8.

Voltage indicator VR1 turns on when the voltage divider formed by ZD6, R14, R15, and ZD7 senses that the voltage level of C4 has exceeded a predetermined value. The light emitted by indicator VR1 indicates that the apparatus is ready for operation.

At this time, the signal line potential at terminal 18 of remote sensor 12' is at a first voltage level which is positive with respect to the reference potential at terminal 20. The voltage difference between the two terminals is regulated by zener diode ZD7 due to current flow from the signal line 34 through the forward biased zener diode ZD8 and the reverse biased zener diode ZD7. This establishes a first voltage level across terminals 18 and 20. This first voltage level is equal to the forward voltage drop across ZD8 plus the zener voltage of ZD7.

Potentiometer R20 divides the voltage and establishes a voltage at its wiper which is diode coupled by D8 to the gate of LASCR1. By this means, integration capacitor C7 is precharged by current flow from terminal 18 through R9, C7, D8, and a portion of R20 to terminal 20. Capacitor C7 is charged such that the gate of LASCR1 is negative with respect to the signal line potential at terminal 18. LASCR1, therefore, is held in an "off" or non-conductive state. Remote sensor 12' is prevented from prematurely actuating commutation switch SCR3 due to extraneous causes.

To initiate a flash, contacts S1 are closed. The closing of contacts S1 shorts ZD2 and drops the signal line potential from the first voltage level to approximately the reference potential. Capacitor C1 discharges through ZD1, ZD5, S1, R19, SCR2 gate-to-cathode, and primary winding 30 to capacitor C1. The time required to turn on SCR2 is rather short and, therefore, C1 does not dissipate much energy until SCR2 turns on. At that time, C1 dumps its charge through SCR2 anode-to-cathode and into primary winding 30. The voltage induced in secondary winding 32 is applied to triggering electrode 26 to turn on FT1.

With SCR2 on, a discharge path is established for charge stored on capacitor C3. It discharges through a current path including SCR2 anode-to-cathode, R19, SCR1 gate-to-cathode, and resistor R5. A time constant of C3 and R5 is selected so that the gate current is maintained on SCR1 until sufficient current is available through flash tube FT1 to keep SCR1 in conduction.

When SCR2 turns on, the potential at condutor 28 is reduced. This causes capacitor C2 to drive signal line 34 negative to a second (negative) voltage level determined by zener diode ZD8. The time constant of C2 and R2 allows C2 to maintain the second voltage level and thereby power remote sensor 12' until the flash is completed.

The bias signal on capacitor C7 prevents the false triggering of LASCR1 during the time when the signal line potential is being driven negative. The negative voltage on capacitor C7 maintains a negative gate-to-cathode potential on LASCR1 during this time period.

When a negative potential of the second level is established at terminal 18, an enabling signal voltage is established at the anode of LASCR1 which is equal to the zener voltage of ZD8 and which is positive with respect to the cathode of LASCR1. The enabling signal voltage effectively powers or enables LASCR1. That is, the potential difference appearing across LASCR1 anode-to-cathode is of such a magnitude to enable LASCR1 to become conductive upon receipt of a subsequent triggering signal at its gate.

When LASCR1 is enabled, its light sensitive junction reacts to light and produces a current representative of the amount of light received. This current flows through the gate of LASCR1 to integrating capacitor C7 and through anticipation resistor R9. This current charges capacitor C7 in a direction opposite to the bias signal. When the voltage at the gate of LASCR1 exceeds the voltage at the cathode of LASCR1 by an amount sufficient to forward bias the gate — cathode junction, LASCR1 becomes conductive.

When LASCR1 becomes conductive, it essentially shorts out zener diode ZD8. The signal line potential, therefore, exhibits a step change to a level which is nearly that of the reference potential. This positive step change is coupled through resistor R16 and capacitor C5 to the gate of commutation switch SCR3. The positive going voltage on the gate of SCR3 turns on SCR3.

When commutation switch SCR3 is turned on, commutation capacitor C4 is charged in an opposite direction through SCR3 anode-to-cathode, $C_M$, FT1, and L2. This causes a reduction in voltage at the anode of SCR1 and turns off SCR1, thereby terminating the flash.

In conclusion, the trigger circuit of the present invention allows direct firing of trigger SCR2 with a "hard" gate pulse. This simplifies the triggering circuit and provides greater reliability. In addition, the trigger circuit of the present invention provides for constant triggering voltage and prevents false triggering due to contact bounce or noise.

Although the present invention has been described with reference to a series of preferred embodiments, workers skilled in the art will recognize that changes may be made in form and detail without departing from the spirit and scope of the invention. For example, in the embodiment shown in FIG. 2, zener diodes ZD2 and ZD5 are connected in parallel with zener diodes ZD7 and ZD8. It is possible, and sometimes advantageous to connect the contacts across ZD7 rather than ZD2. This is shown in phantom in FIG. 2. No difference in circuit operation occurs.

The embodiments of the invention in which an exclusive property or right is claimed are defined as follows:

1. In an electronic flash system including electronic flash apparatus, contact means operable by a user, and light sensing means positioned remotely with respect to the electronic flash apparatus, the invention comprising:
   flash producing means;
   first and second terminals adapted to be connected to the light sensing means, and having the contact means connected therebetween;
   switching means having first and second main current carrying electrodes and a control electrode, the switching means causing actuation of the flash producing means when the switching means switches from a non-conductive to a conductive state;
   first potential establishing means connected between the first main current carrying electrode and the first terminal for establishing a potential therebetween;
   second potential establishing means connected between the first and second terminals for establishing a potential between the first and second terminals prior to closure of the contact means; and
   first capacitor means for producing, in response to closure of the contact means, a signal to the control electrode of the switching means to cause the switching means to switch from a non-conductive to a conductive state.

2. The invention of claim 1 wherein the first potential establishing means comprises:
   first potential limiting means; and energy source means.

3. The invention of claim 2 wherein the first potential limiting means comprises first zener diode means.

4. The invention of claim 3 wherein the energy source means comprises second capacitor means.

5. The invention of claim 1 wherein the second potential establishing means comprises second potential limiting means.

6. The invention of claim 5 wherein the second potential limiting means comprises second zener diode means.

7. The invention of claim 1 wherein the first capacitor means is connected to the first main current carrying electrode.

8. The invention of claim 7 and further comprising transformer means having a primary and a secondary.

9. The invention of claim 8 wherein the first capacitor means, the primary, and the first and second main current carrying electrodes are connected in a series circuit.

10. The invention of claim 9 wherein the control electrode is connected to the second terminal.

11. The invention of claim 1 wherein the second potential establishing means establishes a potential of first polarity prior to closure of the contact means, and wherein a potential of a second polarity appears between the first and second terminals after the switching means switches to a conductive state.

12. The invention of claim 11 and further comprising:
    first isolating means for isolating the contact means from the first terminal means when the potential between the first and second terminals has the second polarity.

13. The invention of claim 12 and further comprising:
    second isolating means for isolating the second potential establishing means from the first terminal when the potential between the first and second terminals has the second polarity.

14. The invention of claim 13 wherein the first isolating means comprises third zener diode means.

15. The invention of claim 14 wherein the second isolating means also comprises the third zener diode means.

16. The invention of claim 15 wherein the third zener diode means is connected in series with the contact means between the first and second terminals.

17. The invention of claim 16 wherein the first potential establishing means comprises first zener diode means and second capacitor means, and wherein the second potential establishing means comprises second zener diode means.

18. The invention of claim 17 wherein the first zener diode means is connected between the first main current carrying electrode and the first terminal.

19. The invention of claim 18 wherein the second capacitor means is connected between the first main current carrying electrode and the first terminal means.

20. The invention of claim 19 wherein the second zener diode means is connected in parallel with the contact means.

21. The invention of claim 20 wherein the first zener diode means has an anode connected to the first terminal and a cathode connected to the first main current carrying electrode, the second zener diode means has an anode connected to the second terminal and a cathode connected to a cathode of the third zener diode means, and the third zener diode means has an anode connected to the first terminal.

22. In an electronic flash system including electronic flash apparatus, contact means operable by a user to initiate a light flash, and light sensing means positioned remotely with respect to the electronic flash apparatus, the invention comprising:

flash producing means for producing light in response to an ignition signal;

first and second terminals adapted to be connected to the light sensing means and adapted to have the contact means connected therebetween;

switching means having first and second main current carrying electrodes and a control electrode;

first capacitor means for providing energy for the ignition signal and a triggering signal;

first potential establishing means connected between the first main current carrying electrode and the first terminal for establishing a potential therebetween;

second potential establishing means connected between the first and second terminals for establishing a potential between the first and second terminals prior to closure of the contact means;

triggering circuit comprising the contact means, the first and second potential establishing means, and the first capacitor means, the triggering circuit being connected to the control electrode of the flash trigger switching means for applying the triggering signal to the control electrode of the switching means to switch the switching means to a conductive state; and ignition signal circuit comprising the capacitor means and the switching means for providing the ignition signal when the switching means is in the conductive state.

23. The invention of claim 22 and further comprising transformer means having a primary and secondary winding.

24. The invention of claim 23 wherein the ignition signal circuit comprises:

a series circuit including the first capacitor means the first and second main current carrying electrodes, and the primary winding; and the secondary winding connected to a triggering terminal of the flash producing means to apply the ignition signal.

25. The invention of claim 24 wherein the triggering circuit comprises a series circuit including the first capacitor means, the first potential establishing means, the contact means, the control electrode, the second main current carrying electrode, and the primary winding, and wherein the second potential establishing means is connected in parallel with the contact means.

26. The invention of claim 25 wherein the first potential establishing means comprises:

first potential limiting means; and energy source means.

27. The invention of claim 26 wherein the first potential limiting means comprises first zener diode means and wherein the energy source means comprises second capacitor means.

28. The invention of claim 27 wherein the second potential establishing means comprises second zener diode means.

29. The invention of claim 28 and further comprising:

first isolating means for isolating the contact means from the first terminal when the potential between the first and second terminals changes from a first polarity to a second polarity.

30. The invention of claim 29 and further comprising:

second isolating means for isolating the second zener diode means from the first terminal when the potential between the first and second terminals changes from a first polarity to a second polarity.

31. The invention of claim 30 wherein the first isolating means comprises third zener diode means.

32. The invention of claim 31 wherein the second isolating means also comprises the third zener diode means.

33. The invention of claim 32 wherein the third zener diode means is connected in series with the contact means between the first and second terminals.

* * * * *